US008755337B2

(12) United States Patent
Beming et al.

(10) Patent No.: US 8,755,337 B2
(45) Date of Patent: Jun. 17, 2014

(54) METHOD FOR MAPPING LOGICAL CHANNEL ON SHARED CHANNEL (75) Inventors: Per Beming, Stockholm (SE); Janne Peisa, Espoo (FI); Mats Sagfors, Kyrkslätt (FI); Johan Torsner, Masaby (FI); Stefan Wager, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 993 days.

(21) Appl. No.: 12/441,251

(22) PCT Filed: Sep. 11, 2007

(86) PCT No.: PCT/SE2007/000790
§ 371 (c)(1),
(2), (4) Date: Nov. 16, 2009

(87) PCT Pub. No.: WO2008/033072
PCT Pub. Date: Mar. 20, 2008

(65) Prior Publication Data
US 2010/0074192 A1    Mar. 25, 2010

(30) Foreign Application Priority Data

Sep. 13, 2006 (SE) ...................................... 0601897

(51) Int. Cl.
*H04W 4/00* (2009.01)
(52) U.S. Cl.
USPC ........................................................ 370/329
(58) Field of Classification Search
None
See application file for complete search history.

(56) References Cited

U.S. PATENT DOCUMENTS

| | | | |
|---|---|---|---|
| 2002/0037749 A1* | 3/2002 | Wager | 455/561 |
| 2004/0057387 A1* | 3/2004 | Yi et al. | 370/252 |
| 2004/0117860 A1* | 6/2004 | Yi et al. | 725/147 |
| 2004/0156330 A1 | 8/2004 | Yi et al. | |
| 2005/0063347 A1* | 3/2005 | Sarkkinen et al. | 370/338 |
| 2005/0111410 A1 | 5/2005 | Bazar | |
| 2005/0186959 A1* | 8/2005 | Vialen et al. | 455/432.1 |
| 2006/0025162 A1* | 2/2006 | Cao et al. | 455/466 |
| 2006/0098599 A1 | 5/2006 | Choi et al. | |
| 2006/0209870 A1 | 9/2006 | Lee et al. | |
| 2006/0240766 A1 | 10/2006 | Wilde | |
| 2007/0076641 A1* | 4/2007 | Bachl et al. | 370/310 |
| 2007/0161377 A1* | 7/2007 | Kodikara Patabandi et al. | 455/450 |
| 2009/0232059 A1* | 9/2009 | Sundberg et al. | 370/329 |
| 2010/0105371 A1* | 4/2010 | Chen et al. | 455/416 |
| 2010/0240410 A1 | 9/2010 | Peisa et al. | |

FOREIGN PATENT DOCUMENTS

WO    WO2004028041    4/2004

* cited by examiner

*Primary Examiner* — John Blanton (57) ABSTRACT

According to the invention data in a number of logical downlink intended for one or more mobile terminals are received in a first mapping unit, where at least a first High Speed Radio Network Temporary identity is allocated to these logical downlink channels addressing a group of mobile terminals for allowing transmission of channel data for reception by mobile terminals. A mobile terminal then reads, from a Broadcast Control Channel, necessary information including a High Speed Radio Network Temporary identity allocated to at least one logical downlink channel, where at least said first identity exists among possible identities. It then listens to a high speed shared control channel for the read identity. In case it detects the identity, the terminal follows a scheduling command, receives data on a high-speed downlink shared channel and processes said data.

25 Claims, 5 Drawing Sheets

METHOD FOR MAPPING LOGICAL CHANNEL ON SHARED CHANNEL

FIELD OF THE INVENTION

The present invention relates to methods and arrangements in a wireless wide area system system, which may be a 3$^{rd}$ Generation Wideband Code Division Multiple Access (WCDMA) communication system, in particular the present invention relates to the mapping of logical channels on a High-Speed Downlink Shared Channel.

BACKGROUND

In a typical cellular radio system, mobile terminals communicate via a radio access network (RAN) to one or more core networks. The mobile terminals can be such stations as mobile telephones ("cellular" telephones) and laptops with mobile termination, and thus can be, for example, portable, pocket, hand-held, computer-included, or car-mounted mobile devices which communicate voice and/or data with radio access networks.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the mobile terminals within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM). UTRAN is essentially a radio access network providing wideband code division multiple access (WCDMA) to mobile terminals. The Third Generation Partnership Project (3GPP) has undertaken to evolve further the UTRAN and GSM-based radio access network technologies.

In today's wireless wide area networks, like WCDMA networks, the common transport channels in the downlink, i.e. Paging Channel (PCH), Forward Access Channel (FACH) and Broadcast Channel (BCH), are statically mapped onto physical channels such as Primary Common Control Physical Channel (P-CCPCH) and Secondary Common Control Physical Channel (S-CCPCH) that consume codes and power. The codes are statically assigned to the channels and a normal implementation is that the power cannot be reused for other channels. The BCH is mapped onto the P-CCPCH, whereas the PCH and the FACH are mapped onto the S-CCPCH.

The BCH is used to carry the Broadcast Control Channel (BCCH). BCCH is a logical channel that carries system information, i.e. information on where other common channels are mapped. Thus, the BCCH carries information, e.g., on where the S-CCPCH is located and which of those are carrying FACH, PCH or both. Furthermore, the BCCH carries information on where a High Speed Downlink Shared Channel (HS-DSCH) and its corresponding control channels are mapped. Thus, BCCH, BCH and P-CCPCH are necessary channels that cannot be changed.

The S-CCPCH on the other hand carries PCH and/or FACH. On PCH the paging control channel (PCCH) is mapped. PCCH is used to carry paging messages from a radio resource control protocol (RRC). The FACH is used to carry Common Control Channel (CCCH), Common Traffic Channel (CTCH), Dedicated Control Channel (DCCH) and Dedicated Traffic Channel (DTCH). In addition, FACH is also used to carry Multimedia Broadcast Multicast Services (MBMS) related channels such as MBMS point-to-multipoint Control Channel (MCCH), MBMS point-to-multipoint Traffic Channel (MTCH) or MBMS point-to-multipoint Scheduling Channel (MSCH) and Broadcast Control Channel (BCCH) for mobile terminals or user equipment units in CELL_FACH state. CCCH is used by RRC to communicate with terminals that do not have a cell specific Id (a MAC Id). The identity of the terminal is then carried within the RRC message. CTCH is used for Cell Broadcast Services (CBS). DCCH mapped on FACH is used by RRC to communicate with terminals that have a cell specific Id (a MAC Id). DTCH mapped on FACH is a user plane data transfer channel used by a terminal that has a cell specific Id. DCCH and DTCH can also be mapped onto DCH and HS-DSCH. While it is possible to avoid mapping of DCCH and DTCH onto the FACH in an implementation of the WCDMA standard it has previously been necessary to keep the FACH due to the CCCH, CTCH and the MBMS services.

According to the WCDMA standard these various logical channels are thus mapped onto transport channels that are then transmitted to mobile terminals or user equipment units via physical channels. This mapping is according to the WCDMA standard provided through a number of MAC layer mapping units or MAC entities provided in a so-called MAC layer.

Figure 1:
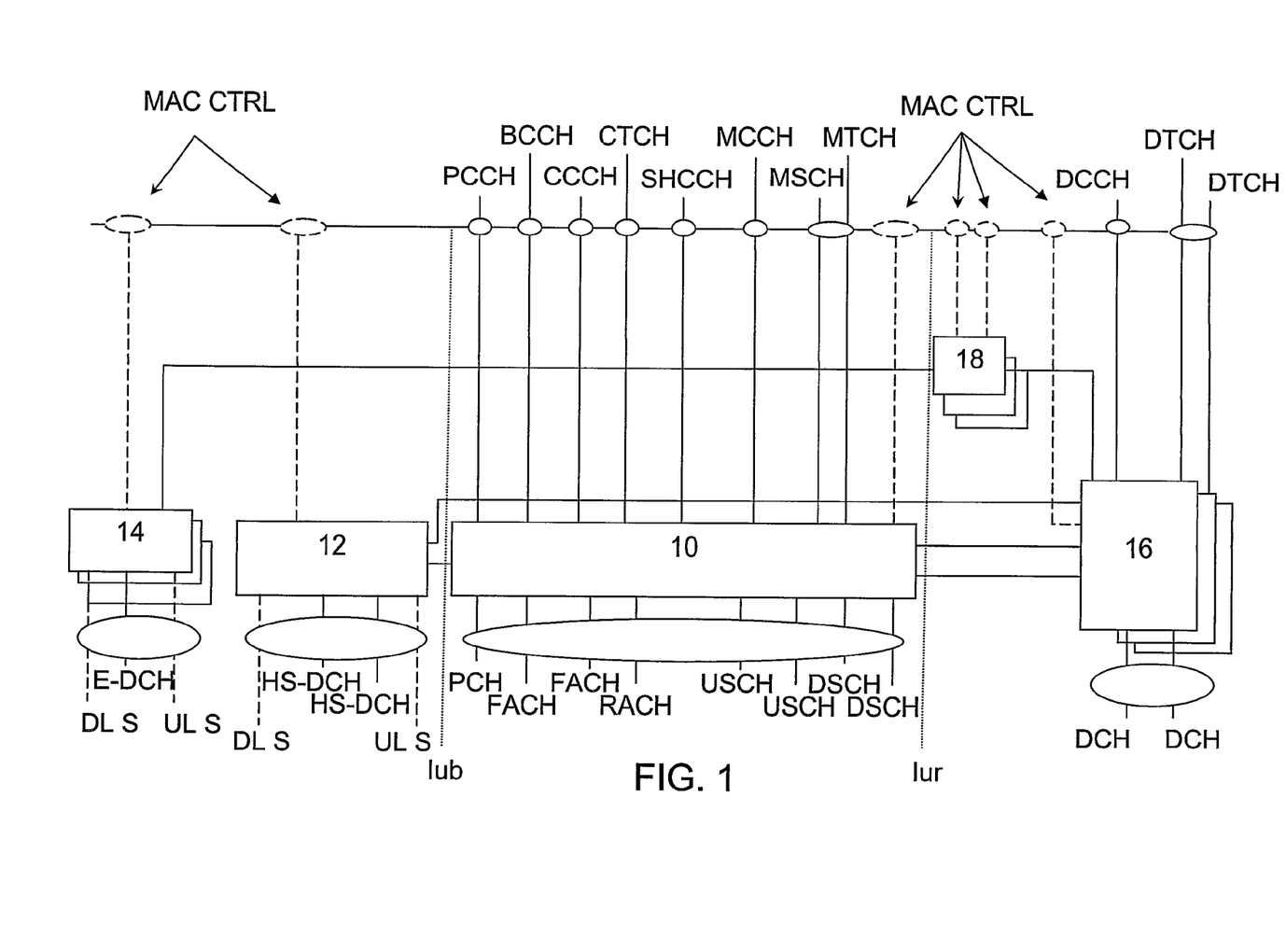
FIG. 1 schematically shows the previously described known MAC architecture according to the state of the art.

FIG. 1 shows a block schematic of a MAC architecture according to this known principle. In the figure there is shown a first mapping unit 10 or MAC entity, which in WCDMA is denoted MAC-c/sh/m. This first mapping unit 10 is connected to RCC units (not shown) provided in an upper layer of the control structure from where it also receives data in the logical channels PCCH, BCCH, CCCH, CTCH, SHCC, MCCH, MSCH and MTCH. Here SHCCH is a Shared Channel Control Channel. The first mapping unit 10 maps these logical channels onto various transport channels PCH, FACH, RACH, USCH and DSCH in order to be carried on various physical channels, like P-CCPCH and S-CCPCH. In order to do this it furthermore receives control signals MAC CTRL from the upper layers of the structure. Here control is indicated by a dashed line originating from upper layers.

There is furthermore a second mapping unit 12, also often denoted MAC-hs, which is responsible for mapping various logical channels onto HS-DSCH and also for the management of the physical resources allocated to HS-DSCH. In order to do this it also receives control signals MAC CTRL from the upper layers of the structure. The logical channels mapped here are normally used for downlink transfer of data. The second mapping unit 12 also provides associated downlink signaling DL S and associated uplink signaling UL S with mobile terminals on associated signaling channels. Here the signaling is indicated with dashed lines.

In the same way there is a third mapping unit 14, also often denoted MAC-e, which is responsible for scheduling logical channels on Enhanced Dedicated Transport Channels (E-DCH). There is here one third mapping unit 14 per mobile terminal that is communicating with the WCDMA network. In order to perform this scheduling the third mapping unit 14 receives control signals MAC CTRL from the upper layers of the structure together with schedule requests from mobile terminals. Also here there is provided associated downlink signaling DL S and associated uplink signaling UL S with mobile terminals on associated signaling channels. E-DCH is with advantage provided for uplink transfer of data. Also here is the signaling indicated with dashed lines. HS-DSCH is thus used for downlink communication, while E-DCH is used for uplink communication.

There is furthermore a fourth mapping unit 16 provided on a mobile terminal per mobile terminal basis, also denoted MAC-d responsible for mapping logical traffic related channels such as Dedicated Traffic Channels (DTCH) and Dedicated Control Channel (DCCH), onto transport channels Dedicated Channels DCH. In order to do this the fourth mapping unit 16 also receives control signals MAC CTRL from the upper layers of the structure.

There is finally a fifth mapping unit 18, also denoted MAC-es and provided on a mobile terminal per mobile terminal basis. This unit 18 handles E-DCH functionality not covered by the third mapping unit 14. Also the fifth mapping unit 18 receives control signals MAC CTRL from the upper layers of the structure.

In FIG. 1 there is furthermore indicated an Iur interface between the first mapping unit 10 and the fourth and fifth mapping units 16 and 18 as well as an Iub interface between the first mapping unit 10 and the second and third mapping units 12 and 14. Thus it is clear that the first mapping unit 10 may be provided in an RNC, the fourth and fifth mapping units may be provided in another RNC and the second and third mapping units 12 and 14 may be provided in a Node-B. Node-B is another term used for a base transceiver station or base station.

Regarding paging in a WCDMA network, a RRC (Radio Resource Control) paging message is used to wake up terminals from sleep mode in Idle, URA_PCH (UTRAN Registration Area_Paging Channel) and CELL_PCH (Cell_Paging Channel) states. The RRC paging message is sent on a Paging Control Channel (PCCH). A Paging Control Channel PCCH is a logical channel that is mapped onto the physical Paging Channel (PCH).

Terminals are divided into different paging groups in order to achieve a power saving for the terminals. At a specific time occasion in discontinuous reception cycle, a so-called DRX cycle of the paging group, the terminals in the paging group wake up and check whether there is paging information to the paging group. A terminal checks that on a paging indicator channel (PICH).

Hence, a terminal in idle, Cell_PCH or URA_PCH state can receive one PCCH, one PCH and one S-CCPCH at regular intervals. Prior to receiving S-CCPCH, the terminal checks the Paging Indicator Channel (PICH) to see if there is a paging message for its paging group on the PCH. Thus a terminal does not listen to the S-CCPCH continuously but at regular intervals controlled by its DRX cycle.

In WCDMA there may be more than one S-CCPCH used for PCH/PCCH. All S-CCPCHs carrying PCH/PCCH are indicated by means of system information on the Broadcast Control Channel (BCCH). The paging groups are spread out over the different S-CCPCHs. The terminal selects its paging group according to a well defined rule based on the International Mobile Subscriber Identity (IMSI). Thus each terminal only listens for paging information on one S-CCPCH.

It has been perceived that in the existing WCDMA-system architecture every S-CCPCH consumes power and codes that are statically allocated by a Radio Network Controller (RNC). Thus the power and codes cannot be reused for other traffic than the S-CCPCH resulting in an inefficient use of resources. This is especially the case if there are few mobile terminals in a cell.

If there were a way to map the logical channels that today use FACH onto some other channel, FACH could be avoided. However, it is not only FACH that uses S-CCPCH. Also PCH does that. Hence one needs to be able to map PCCH onto some other channel than PCH to be able to avoid S-CCPCH and thus save codes and power.

SUMMARY OF THE INVENTION

It is therefore an object of the present invention to provide a wireless wide are system architecture where the logical channel mapped on the common transport channels, e.g. on the downlink, can be mapped in a more efficient way. This is generally achieved by mapping the logical channels in the downlink on the High Speed Downlink Shared Channel (HS-DSCH).

A first aspect of the present invention is therefore directed towards a method in a wireless wide area system supporting High Speed Packet Access, comprising the steps of
receiving data in a number of logical downlink channels intended for one or more mobile terminals, and
allocating a first High Speed Radio Network Temporary identity to data of a first group of said logical downlink channels, which identity addresses a group of mobile terminals, in order to allow said data of the channels in the first group to be transmitted for reception by one or more mobile terminals via a shared high speed downlink channel.

A second aspect of the present invention is directed towards a Radio Network Controller in a wireless wide area system supporting High Speed Packet Access, comprising:
means for receiving data in a number of logical downlink channels intended for one or more mobile terminals, and
means for allocating a first High Speed Radio Network Temporary identity to data of a first group of said logical downlink channels, which identity addresses a group of mobile terminals, in order to allow said data of the channels in the first group to be transmitted for reception by one or more mobile terminals via a high speed downlink shared channel.

A third aspect of the present invention is directed towards a method in a mobile terminal in a wireless wide area system supporting High Speed Packet Access, comprising the steps of
reading from a Broadcast Control Channel necessary information to receive logical downlink channels via a high speed downlink shared channel, said necessary information including a High Speed Radio Network Temporary identity allocated to at least one logical downlink channel, where there exists at least a first High Speed Radio Network Temporary identity allocated to a first group of said logical downlink channels and addressing a group of mobile terminals,
listening to a high speed shared control channel for said High Speed Radio Network Temporary identity,
in case of detecting said identity, following a scheduling command for said High Speed Radio Network Temporary identity,
receiving data on a high-speed downlink shared channel, and
processing said data.

A fourth aspect of the present invention is directed towards a mobile terminal for provision in a wireless wide area system supporting High Speed Packet Access, comprising
means for reading from a Broadcast Control Channel necessary information to receive logical downlink channels via a high speed downlink shared channel, said necessary information including a High Speed Radio Network Temporary identity allocated to at least one logical downlink channel, where there exists at least a first High Speed Radio Network Temporary identity allocated to a first group of said logical downlink channels and addressing a group of mobile terminals, means for listening to a high speed shared control channel for said High Speed Radio Network Temporary identity, means for, in case of detecting said identity, following a scheduling command for said High Speed Radio Network Temporary identity, means for receiving data on a high-speed downlink shared channel, and means for processing said data.

With the mapping of logical downlink channels, e.g., CCCH, CTCH, BCCH, MBMS channels and PCCH onto HS-DSCH instead of FACH and PCH, the physical S-CCPCH channel can be omitted. Doing this, the HS-DSCH and its corresponding control channels may be the only signaling and user data transport channel in the downlink and thus output power and codes can be saved. The network resources are thus used more efficiently. There are furthermore less physical channels to keep track of in the system. Since HS-DSCH is a high-speed channel as compared with S-CCPCH, an increase of the pace at which such data is being transmitted is furthermore obtained, which thus also improves the overall performance of the system.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 2:
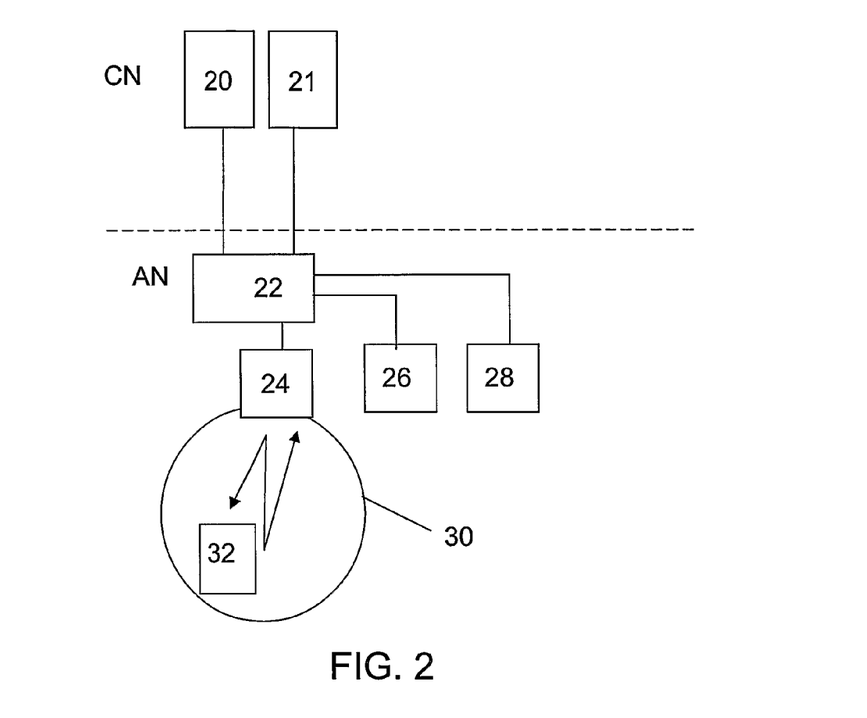
FIG. 2 schematically shows an access network connected to a core network as well as a mobile terminal connected to a cell handled by a base station of the access network, FIG. 3 schematically shows a MAC architecture according to the present invention where the transport channels FACH and PCH have been removed.

The present invention will now be described in more detail in the exemplifying context of a Universal Mobile Telecommunications (UMTS) system shown in FIG. 2. The system may be a WCDMA (Wideband Code Division Multiple Access) system supporting High Speed packet Access (HSPA). In the system there is a core network CN including a first connection-oriented service node 20, which may be a Mobile Switching Centre (MSC) that provides circuit-switched services. The core network CN also includes a second General Packet Radio Service (GPRS) node 21 tailored to provide packet-switched type services, which is sometimes referred to as the serving GPRS service node (SGSN). The service node 20 may be connected to circuit switched networks such as PSTN (Public Switched Telephone Network) or GSM (Global System for Mobile communication). The node 21 may be connected to connectionless-oriented networks such as the Internet.

Each of the core network service nodes 20 and 21 connects to an access network AN of the WCDMA system, which access network is here a UMTS Terrestrial Radio Access Network (UTRAN). UTRAN AN includes one or more radio network controllers (RNC), where only one RNC 22 is shown in FIG. 1. The RNC 22 is connected to a plurality of cells. The RNC 22 is connected to a first base station or base transceiver station BTS 24, a second base station or base transceiver station BTS 26, and a third base station or base transceiver station BTS 28. Each of these base stations 24, 26 and 28 control communication within a cell. Here it should be realized that one base station may handle more than one cell. In the figure only one cell 30 associated with the first base station 24 is shown. The cells are provided in a geographical area covered by the access network AN. In FIG. 2 a mobile terminal 32 is shown in the cell 30 handled by the base station 24 in the access network AN and shown as communicating with this base station 24. It should be realized that normally there may be provided several mobile terminals communicating with a base station.

Figure 3:
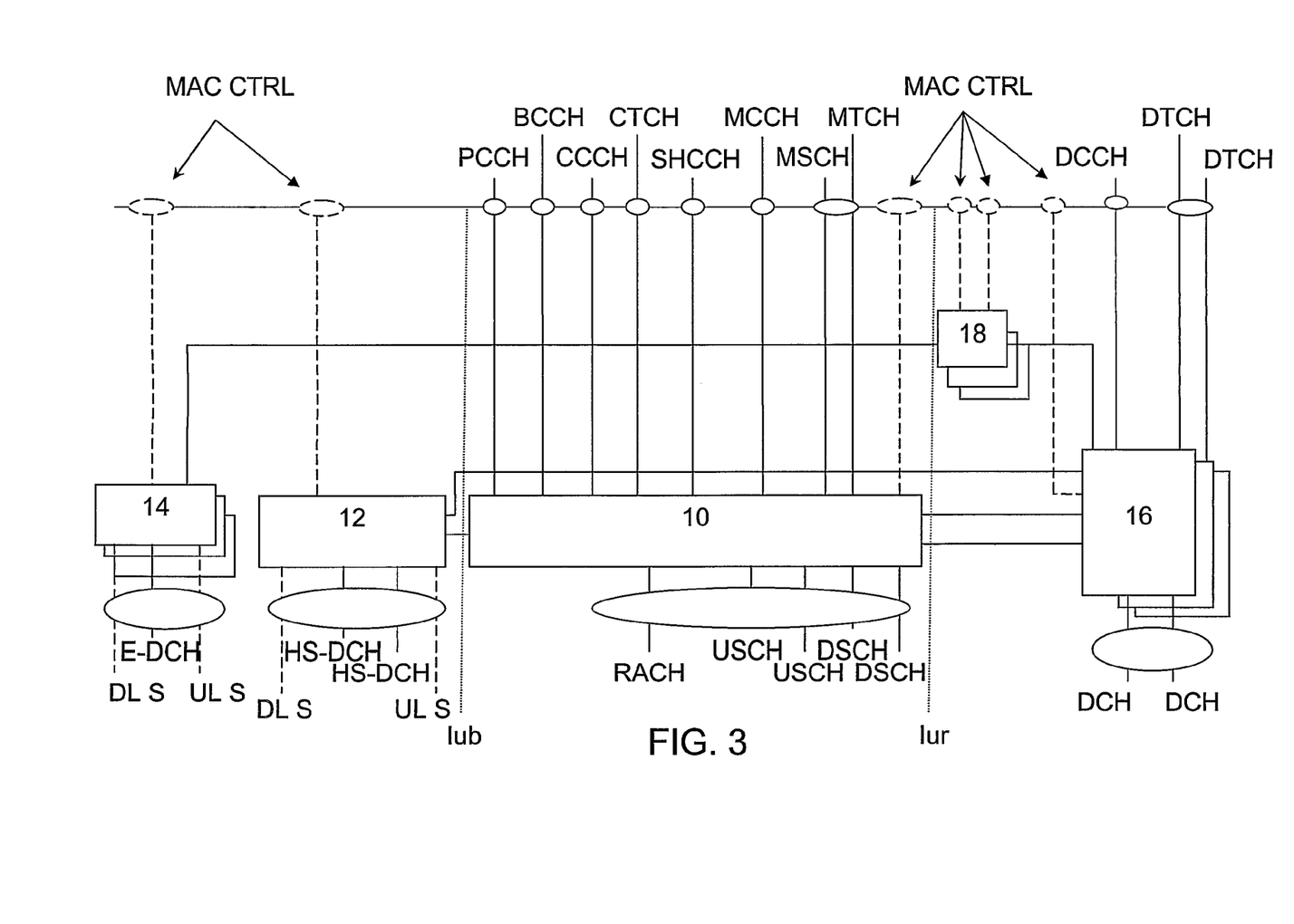

FIG. 3 shows the MAC structure according to the present invention in a schematic drawing that resembles FIG. 1. FIG. 3 differs from FIG. 1 in that the transport channels FACH and PCH have been removed. In all other respects FIG. 3 resembles FIG. 1. It will therefore not be described in any further detail. Here the exemplifying first mapping unit 10 is provided in the RNC 22, while the second mapping unit 12 is provided in a base station, for instance the first base station 24 as is evident from FIG. 3 through the existence of the Iub interface.

Figure 4:
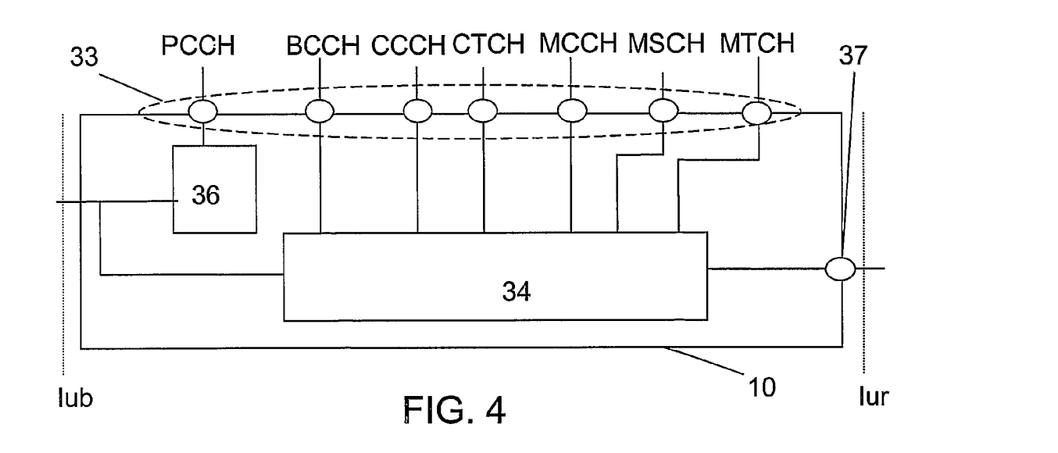
FIG. 4 shows a block schematic of a number of elements provided in a first mapping unit for performing mapping of logical channels according to a first embodiment of the present invention.

FIG. 4 shows a block schematic of the functionality in a first mapping unit 10 according to a first embodiment of the present invention. In the figure only the elements that relate to the present invention are provided. The rest have been omitted for the reason of clarity. With the exception for the elements that provide the functionality of the present invention, the first mapping unit 10 provides the standard functionality of such a MAC c/sh/m mapping unit. The first mapping unit 10 includes a number of inputs 33 for receiving logical downlink channels intended for one or more mobile terminals from the higher levels of the system. There is here one input for each logical channel. A first to sixth input for receiving the channels BCCH, CCCH, CTCH, MCCH, MSCH and MTCH, respectively, are connected to a first mapping element 34, while a seventh input for receiving the PCCH channel is connected to a second mapping element 36. There is an eighth input 37 for receiving data from the fourth mapping unit via an Iur interface. The eighth input 37 is also connected to the first mapping element 34. Both the first and second mapping elements 34 and 36 are finally connected to the second mapping unit (not shown) via the Iub interface.

Figure 5:
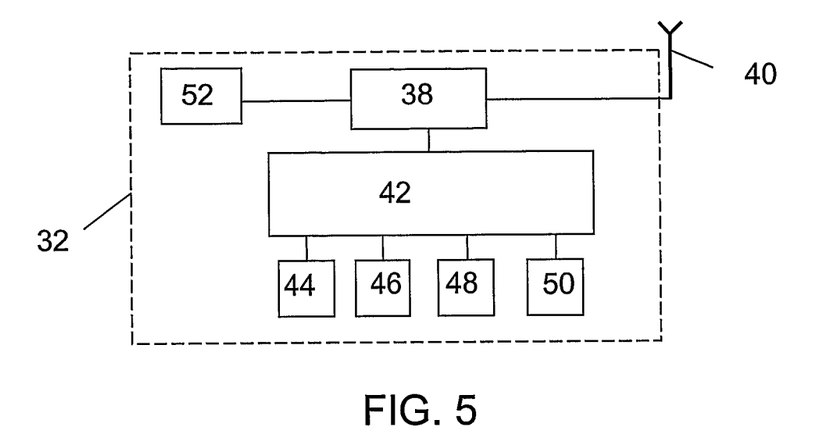
FIG. 5 shows a block schematic of a number of elements provided in a mobile terminal for receiving data being mapped according to the first embodiment of the present invention

FIG. 5 shows a block schematic of a number of elements providing corresponding functionality in a mobile terminal 32 according to a first embodiment of the present invention. In the figure only the elements that relate to the present invention are provided. The rest have been omitted for the reason of clarity.

There is an antenna 40 connected to a radio circuit 38 for receiving radio signals. The radio circuit 38 is in turn connected to a processing unit 42, where the processing unit 42 which is in turn connected to a first, second, third and fourth channel handling unit 44, 46, 48 and 50, each being arranged to process data according to one or more logical channels identified in the header of data of a logical channel. How this is done will be described in more detail later on. A first channel handling unit 44 is here a CCCH channel handling unit, a second channel handling unit 46 is a DCTC/DCCH channel handling unit, a third channel handling unit 48 is a CTCH channel handling unit and a fourth channel handling unit 50 is an MBMS channel handling unit. There is furthermore a fifth channel handling unit 52 connected to the radio circuit 38 that is here a PCCH channel handling unit.

It is the basic idea of the present invention to use the High Speed Downlink Shared Channel (HS-DSCH) as transport channel instead of the Paging Channel (PCH) and Forward Access Channel (FACH) transport channels to carry, e.g., Common Control Channel (CCCH), Common Traffic Channel (CTCH), Broadcast Control Channel (BCCH), paging control channel (PCCH) information as well as Multimedia Broadcast Multicast Services (MBMS) related channels such as MBMS point-to-multipoint Control Channel (MCCH), MBMS point-to-multipoint Traffic Channel (MTCH) and MBMS point-to-multipoint Scheduling Channel (MSCH) plus Dedicated Control Channel (DCCH) and Dedicated Traffic Channel (DTCH). As stated above, the HS-DSCH already today can carry DTCH and DCCH.

The operation of the first mapping unit 10 for providing the functionality according to the first embodiment of the present invention will now be described with reference being made to FIGS. 2, 3, 4 and 6, where the latter shows a number of method steps in a method according to the first embodiment of the present invention and being performed in the first mapping unit 10.

Figure 6:
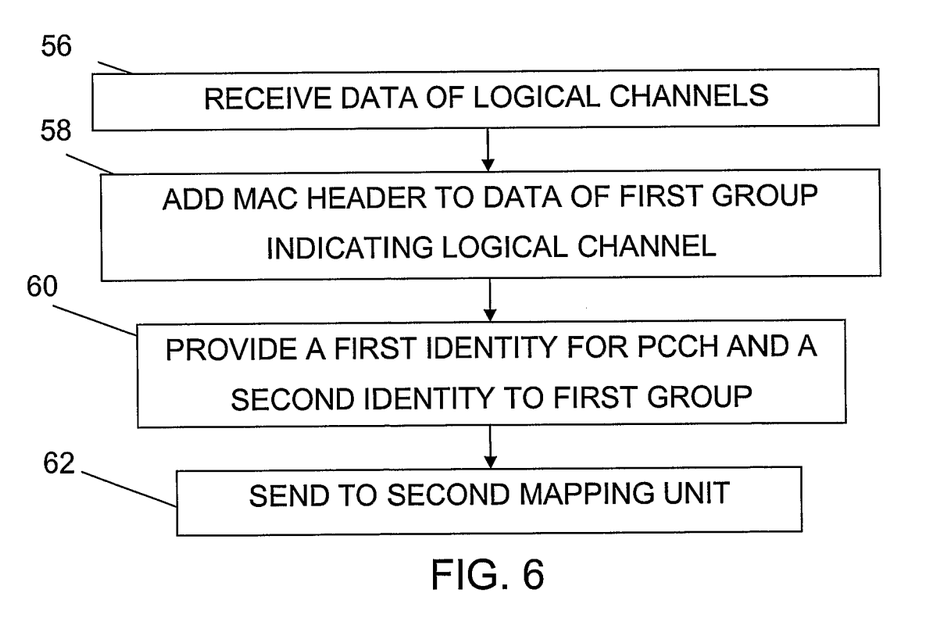
FIG. 6 shows a flow chart of a number of general method steps taken in a method according to the first embodiment of the present invention and being performed in the first mapping unit.

The first mapping unit 10, which is provided in the first RNC 22, receives data in a number of logical channels from higher layers of the system architecture, step 56. It may here also receive data in dedicated logical channels DCCH and DTCH from the fourth mapping unit 16 via the interface Iur. This data from the fourth mapping unit 16, which fourth mapping unit 16 is thus a MAC-d mapping unit, is then accompanied by an identity that is specific for and assigned to a certain mobile terminal, a so-called MAC id. The reception of such data is in itself well known within the art and will therefore not be described in any more detail here. However, according to the first embodiment of the present invention the data of the PCCH channel received on the seventh input are provided to the second mapping element 36 and data of the channels BCCH, CCCH, CTCH, MCCH, MSCH and MTCH received on the second to seventh input are sent to the first mapping element 34. This first mapping element 34 would then possibly also receive the above mentioned DCCH and DCCH data. These logical channels that the first mapping element 34 receives data from here make up a first group of channels. In this first mapping element 34 a header, here a so-called MAC header and more particularly a MAC-c/sh/m header, is added to the data of these channels in a known fashion, where the header among other things indicates which logical channel it is and also includes a possible cell-specific terminal identity, a MAC id, if such a terminal identity is provided, step 58. So far the first mapping element 34 is operating according to standard principles in mapping logical channels to the FACH channel. However the first mapping element 34 has a new functionality. It allocates a first High Speed Radio Network Temporary Identity (H-RNTI) to data of the various channels of the first group. The second mapping element 36 also allocates a second High Speed Radio Network Temporary Identity (H-RNTI) to the data of the PCCH channel. Such identities are normally provided by the second mapping unit 12, which implements a MAC-hs mapping unit, to various mobile terminals for sending data dedicated to a specific mobile terminal over the High Speed data channel HS-DSCH. These identities are therefore normally terminal specific in that they are temporarily allocated to specific mobile terminals. According to the first embodiment of the present invention, they are thus also used for indicating a single logical downlink channel and/or a group of logical downlink channels. They also both address a group of mobile terminals. There may also be more such identities for the single channel and the first group of channels, where these further identities would then be provided for other groups of terminals. In this first embodiment the first identity can be seen to be allocated to a virtual FACH channel and the second identity to be allocated to a virtual PCH channel. Thus according to the first embodiment of the present invention the first mapping element 34 provides a first such identity for data in all of the channels in the first group and the second mapping element 36 provides a second such identity for the PCCH channel, step 60. The first mapping element 34 therefore provides means for allocating a first high-speed radio network identity to data of a first group of logical downlink channels, while the second mapping element 36 provides means for allocating a second high-speed radio network identity to data of a single logical downlink channel. Both these mapping elements 34 and 36 then send the data and associated identifiers to the second mapping unit 12, which is here provided in the base station 24 for transmission over the HS-DSCH channel. In this way one or more mobile terminals are allowed to receive data of the logical downlink channels of the first group as well as of the single paging channel via a shared high-speed downlink channel, namely the HS-DSCH.

The system then makes sure that the identities are signaled on the BCCH together with other information that is necessary for locating a logical channel on the HS-DSCH. This is normally controlled by high layer structures indicated (but not shown) in FIG. 3.

Figure 7:
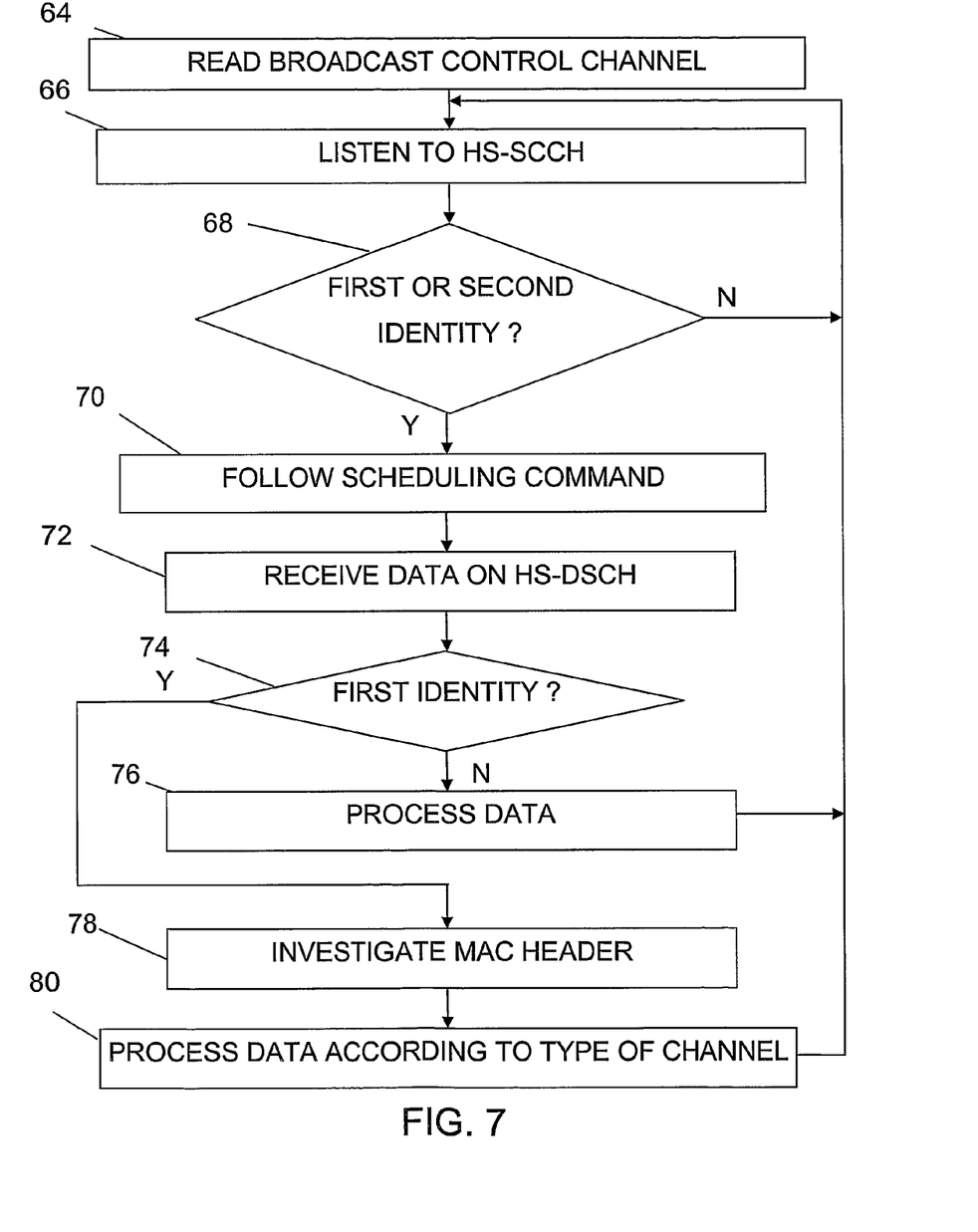
FIG. 7 shows a flow chart of a number of general method steps taken in a method according the first embodiment of the present invention being performed in the mobile terminal.

How a mobile terminal handles this data will now be described with reference also being made to FIGS. 5 and 7, where the latter shows a flow chart of a number of corresponding method steps according to the first embodiment of the present invention being performed in a mobile terminal.

A mobile terminal, for instance mobile terminal 32, uses the radio circuit 38 and antenna 40 for listening or reading the Broadcast Control channel BCCH, step 64, and listens for information about where the logical channels described above will appear. The BCCH channel therefore includes information about where these logical channels will appear (here the HS_DSCH), where the existence of such data will be signaled (here HS-SCCH (High Speed Shared Control Channel)) as well as what identities, i.e., H-RNTIs, that are used for such signaling. The mobile terminal 32 then uses the radio circuit 38 to listen to the HS-SCCH that is provided by the second mapping unit 12, step 66. It then waits for the first or second identity. As long as the first or second identities are not detected, step 68, it continues listening to the HS-SCCH, step 66. If however it reads the first or the second identities, step 68, it continues and follows a scheduling command sent together with such an identity, step 70. The scheduling process is here the same that was previously used when selecting FACH and PCH. The radio circuit 38 then tunes to the HS-DSCH channel as indicated by the scheduling command and receives data, step 72. If the identity was the second identity, step 74, the data is then forwarded from the radio circuit 38 to the fifth channel handling unit 52, which is paging channel handling unit arranged to handle or process paging data in a known way, step 76. If however the identity was the first identity, step 74, the data is forwarded to the processing unit 42. The processing unit 42 then investigates the MAC header, step 78, in order to determine which type of channel was used and then forwards the data to the appropriate channel handling unit 44, 46, 48 or 50 associated with the channel. The selected channel handling unit 44, 46, 48 or 50 will then process the data in a known way, step 80. The radio circuit 38 thus provides means for reading from a Broadcast Control Channel (BCCH) necessary information to receive downlink logical channels via a high speed downlink shared channel, including a High Speed Radio Network Temporary identity (H-RNTI) allocated to at least one logical downlink channel, means for listening to a high speed shared control channel for the High Speed Radio Network Temporary identity, means for, in case of detecting said identity, following a scheduling command for the High Speed Radio Network Temporary identity, and means for receiving data on a high-speed downlink shared channel. The combination of processing unit 42 and channel handling units 44, 46, 48, 50, 52 together provide means for processing such read data.

If PCCH data are transmitted, the terminal thus directly knows this, since such data has an own identity, namely the second identity.

If DCCH or DTCH data are transmitted the processing unit 42 may use the header to see if the data was intended for the terminal. This is done if the header includes a MAC id. If not, the data may be discarded directly and thus not sent to the corresponding channel handling unit. If however such data was intended for the terminal, the data are instead forwarded to the second channel handling unit 46 which processes the data according to the MAC-d higher protocol layers. If the header indicated CCCH, the data is routed to the first channel handling unit 44 that implements the corresponding higher layer RRC protocol. If the header indicates CTCH, the data is forwarded to the third channel handling unit 48 for being treated as Cell Broadcast data. If the header indicates MCCH, MTCH or MSCH, the data is finally forwarded to the fourth channel handling unit 50 for being treated as MBMS traffic data.

The above described embodiment of the invention has a number of advantages. It allows the removal of the S-CCPCH channel. In this way power and codes can be reused for other traffic. The network resources are thus used more efficiently. There are furthermore less physical channels to keep track of. HS-DSCH is furthermore faster than S-CCPCH, which means that the provision of various services will be faster, for instance the setting up of a call. Thus an increase of the pace at which data is being transmitted is obtained, which improves the overall performance of the system. The first embodiment has the further advantage in that modifications of the existing WCDMA network is limited since the identities are essentially provided for the two transport channels that are removed.

The first embodiment described above had one virtual PCH channel and one virtual FACH channel. It should here be realized that there may be more such virtual channels, each being associated with a corresponding High Speed Radio Network Temporary Identity (H-RNTI).

Alternatively, in another embodiment of the invention, separate identities, i.e. H-RNTIs, can also be used to indicate CTCH, MCCH, MTCH or MSCH transmission. In this embodiment there will thus be a first and a second group of channels, each group indicated by a separate identity, where the first group is made up of the channels BCCH and CCCH and is associated with the first identity, while the second group is made up of the channels CTCH, MCCH, MSCH and MTCH and is associated with a further identity, which is here a third identity. Here the first group includes channels that send data intended for a specific mobile terminal and the second group include channels that send data intended for a group of terminals. The benefit of using these separate identities would be that MTMS traffic is separated from DCCH/DTCH/CCCH traffic, which may bring power savings in some scenarios.

According to another embodiment of the present invention, there is no separate identity for the channel PCCH, but it is included in the first group. In this case, the header can be extended to also be able to indicate PCCH. For this solution the fifth channel handling unit in FIG. 6 would then be connected to the processing unit instead of to the radio circuit.

There can naturally be further identities, where there may be one identity for each channel handling unit shown in FIG. 5. Another alternative is one identity for each possible logical channel originally provided on S-CCPCH.

A mobile terminal can be in idle mode as well as in a number of states in a WCDMA network. These states are, a CELL_PCH state, a CELL_FACH state, a CELL_DCH state or URA_PCH state. In idle mode a terminal is not connected to the network, while in CELL_PCH state it listens to a paging channel, which in the first embodiment was to the second identity, in the CELL_FACH state it listens to the FACH channel but where no dedicated physical channels have been allocated. In the first embodiment it would here be listening to the first identity. In CELL_DCH state there is a dedicated DCH channel allocated to the mobile terminal. URA_PCH state is similar to the CELL_PCH state. Here the mobile terminal updates the network about its location after having crossed a URA border, where URA is a group of cells. Here the CELL_DCH state may be seen as an active communication state, while the other states may be seen as non-active communication states.

In a contemporary WCDMA-system, the PCH channel is preceded by a Paging Indicator send on a Paging Indicator Channel (PICH). According to the present invention the PICH can still be applied. In such case, the PICH is transmitted prior to the scheduling of the second identity (H-RNTI) indicating the PCCH transmission. The terminals that are in CELL_PCH or Idle mode select a paging group according to known principles and listen to the PICH. However, at the time of a page message to the mobile terminals paging group, the mobile terminal tunes in to the HS-SCCH instead of the S-CCPCH. On the HS-SCCH the terminal listens for the scheduling information for its second identity. Then the terminal follows the scheduling information and receives the paging message on the HS-DSCH, as described above.

The higher layers above MAC-hs are not changed, except for the RRC, which on the BCCH signals the identities that correspond to the S-CCPCH/PCH/PCCH. By doing this, the rules for selecting a paging group can remain the same as for contemporary WCDMA-systems. However, any other rule can in principle be selected.

For the uplink UL, the E-DCH can be used for all logical channels except for the CCCH, and for messages transported on DCCH when the terminal answer to page or wants to send user data on an E-DCH.

In a further embodiment of the present invention, the PICH and HS-DSCH can also be used to deliver user data to users in CELL_PCH state. Upon receiving the PICH indication, all terminals belonging to a paging group reads an identity (H-RNTI) from the HS-SCCH. The identity may be dedicated to a specific mobile terminal or a group identity for several mobile terminals as in the first embodiment described above. Having detected the right identity, the terminal decodes the HS-DSCH and receives the message. The MAC header may here be used to indicate whether the message is a paging message or user data. In case user data is transmitted for a shared group identity, there may furthermore be a MAC id in the MAC header in order to identify the mobile terminal.

It is known to allocate a dedicated identity to terminals for transmission of data to terminals that are in an active communication state, a CELL_DCH state. A terminal is then allocated a dedicated H-RNTI for signaling where data on dedicated logical channels are to be received. According to the present invention, such dedicated data can also be sent on dedicated logical channels when the terminal is in a non-active communication state, such as CELL_PCH, CELL_FACH and URA_PCH state. Thus the present invention also allows more data transmission for terminals in CELL_PCH state. Through letting the terminals keep such a dedicated identity (H-RNTI) also while being in CELL_PCH state, the network may choose to send the data directly after the PICH using the stored identity on HS-SCCH, instead of first moving the terminal to CELL_FACH or CELL_DCH.

Alternatively, such further data can be transmitted using the first identity identifying the virtual FACH, and using the header to identify the terminal.

Staying in CELL_PCH may be preferable for small amounts of data, like keep-alive messaging, where the signaling overhead would be substantial if moving the terminal to CELL_FACH or CELL_DCH. Staying in CELL_PCH rather than CELL_FACH is preferable from a terminal battery consumption point of view.

Direct transition from CELL_DCH to CELL_PCH is also preferable from an RRC signaling point of view, since it reduces the amount of configuration data in the reconfiguration message. The reconfiguration message to move from CELL_PCH to CELL_DCH does not need to contain Radio Bearer and Transport Channel configuration information, since the terminal can use stored previous configuration.

The network still uses the PICH to further optimize the sleep mode. However, this is according to the present invention not strictly required. It would in principle be possible for the terminals to listen on HS-SCCH for the second identity at its paging occasion. With the PICH, the terminal listens to the PICH in its paging occasion and only in case the PICH indicates that there is a paging message for the paging group, the terminal listens for the second identity. With the PICH approach there is a possibility to have several paging groups on the same identity at the same time instance.

In WCDMA, the transmission time interval (TTI) of the PCH is 10 ms whereas for HS-DSCH the TTI is 2 ms. Thus in WCDMA, the paging message is transmitted over 10 ms, which gives a better time diversity than the 2 ms TTI of the HS-DSCH. There are several conceivable alternatives for handling this situation: According to one alternative the terminal listens on the HS-SCCH for 10 ms after the PICH was received to get the scheduling information. According to a more general alternative the terminal listens for X ms, where X is either broadcast or signaled by RRC and in principle can take any value that is a multiple of 2 ms. There is also an option for the mobile terminal to soft combine the repetitions of the HS-SCCH to improve reception and increase the coverage.

As stated in the paragraph above, the TTI for WCDMA PCH is 10 ms and the common TTI for HS-DSCH is 2 ms. However, the PCH channel is 32 kbps. Thus, it is possible to send 32 kbps in a 2 ms TTI reaching the same coverage as when transmitting using a 10 ms TTI, however using a higher peak power. Alternatively, it is possible to use multiple TTIs of 2 ms to decrease the needed peak power and send the information over time instead.

Transmitting over several TTIs may especially become necessary when transmitting user data to terminals in CELL_PCH. Packets to be delivered may contain hundreds of bytes, which would require bit rates up to 2 Mbps, if transmitted in one TTI. Consequently, the terminal should monitor the HS-SCCH for several TTIs in this state. There are several ways in which the length of this monitoring period can be defined:

Having received the PICH, the terminal shall monitor the HS-SCCH
   a) for a predefined period of time, e.g. 10 ms;
   b) until it receives a no more data indication included in the HS-SCCH; or
   c) for the whole DRX cycle, i.e. until the next PICH occasion.

In the lack of a return channel in CELL_PCH state, it is noted that link adaptation and Hybrid Automatic Repeat Request (HARQ) are not possible for the HS-DSCH transmission. It is therefore recommendable to use the CELL_PCH state for small infrequent data transmissions.

The first data mapping unit according to the present invention can be implemented through one or more processors together with computer program code for performing its functions. The program code mentioned above may also be provided as a computer program product, for instance in the form of a data carrier carrying computer program code for performing the method according to the present invention when being loaded into a computer. The first data mapping unit can also with advantage be realized in the form of a suitable programmed ASIC circuit. The processing unit and the channel handling units of a mobile terminal may also be implemented in the same way.

While the invention has been described in connection with what is presently considered to be most practical and preferred embodiments, it is to be understood that the invention is not to be limited to the disclosed embodiments, but on the contrary, is intended to cover various modifications and equivalent arrangements. The invention was for instance described in relation to a WCDMA system. However, it should be realized that the invention is in no way limited to this but can be used in any wireless wide area system. Therefore the present invention is only to be limited by the following claims.

The invention claimed is:

1. A method in a wireless wide area system supporting High Speed Packet Access, the method comprising:
   receiving data in a number of logical downlink channels intended for one or more mobile terminals;
   allocating a first High Speed Radio Network Temporary identity to data of a first group of said logical downlink channels, which identity addresses a group of mobile terminals;

transmitting said data of the channels in the first group for reception by the one or more mobile terminals via a high speed downlink shared channel; and transmitting data of a single logical downlink paging channel for reception by the one or more mobile terminals via the high speed downlink shared channel, wherein the high speed downlink shared channel is a transport channel for the first group of said logical downlink channels and for the single logical downlink paging channel.

2. The method according to claim 1, further comprising the step of adding a header to data of the logical channels of the first group at least indicating the corresponding logical channel.

3. The method according to claim 1, further comprising the step of transmitting a paging indicator before transmitting an identity that is associated with a logical downlink paging or dedicated user channel.

4. The method according to claim 1, wherein said first identity indicates said first group of channels.

5. The method according to claim 1, further comprising the step of allocating a further High Speed Radio Network Temporary identity to data of a second group of said logical downlink channels, which further identity addresses a group of mobile terminals, where the first group are channels that send data that is intended for a specific mobile terminal and the second group are channels that send data intended for the group of terminals.

6. The method according to claim 1, further comprising the step of transmitting the High Speed Radio Network Temporary identity and a corresponding scheduling command on a high-speed control channel and said data on the high speed downlink shared channel.

7. The method according to claim 1, further comprising the step of broadcasting information enabling mobile terminals to receive logical downlink channels of said group, using said High Speed Radio Network Temporary identity in order to inform the mobile terminals of where to receive said data.

8. The method according to claim 1, further comprising the step of retaining a second High Speed Radio Network Temporary identity that has been mapped to data of a logical channel for a dedicated mobile terminal being in an active communication state for use also in sending dedicated control and data to the dedicated mobile terminal, when the terminal is in a non-active communication state.

9. The method according to claim 8, wherein the active communication state is the CELL_DCH state.

10. The method according to claim 8, wherein the non-active communication state is a state in the group of CELL_FACH state, CELL_PCH state and URA_PCH state.

11. The method according to claim 1, further comprising the step of allocating a second identity to data of the single logical downlink paging channel.

12. The method according to claim 11, wherein the second identity addresses a group of mobile terminals.

13. The method according to claim 11, wherein the second identity addresses a dedicated mobile terminal.

14. A Radio Network Controller in a wireless wide area system supporting High Speed Packet Access, the Radio Network Controller comprising:

processing circuitry configured to receive data in a number of logical downlink channels intended for one or more mobile terminals;

the processing circuitry further configured to allocate a first High Speed Radio Network Temporary identity to data of a first group of said logical downlink channels, which identity addresses a group of mobile terminals;

the processing circuitry further configured to transmit said data of the channels in the first group for reception by the one or more mobile terminals via a high speed downlink shared channel; and the processing circuitry further configured to transmit data of a single logical downlink paging channel for reception by the one or more mobile terminals via the high speed downlink shared channel, wherein the high speed downlink shared channel is a transport channel for the first group of said logical downlink channels and for the single logical downlink paging channel.

15. A method in a mobile terminal in a wireless wide area system supporting High Speed Packet Access, the method comprising:

reading from a Broadcast Control Channel necessary information to receive logical downlink channels via a high speed downlink shared channel, said necessary information including a High Speed Radio Network Temporary identity allocated to at least one logical downlink channel, where there exists at least a first High Speed Radio Network Temporary identity allocated to a first group of said logical downlink channels and addressing a group of mobile terminals;

listening to a high speed shared control channel for said High Speed Radio Network Temporary identity;

in case of detecting said identity, following a scheduling command for said High Speed Radio Network Temporary identity, receiving data on the high-speed downlink shared channel, and processing said data.

16. The method according to claim 15, wherein said read High Speed Radio Network Temporary identity is a High Speed Radio Network Temporary identity allocated to a group of channels, for which said associated data includes a header and further comprising the steps of investigating said header for information about which logical channel said data is associated with and selecting processing based on said logical channel information.

17. The method according to claim 16, wherein said first identity is associated with channels that provide data intended for a specific mobile terminal.

18. The method according to claim 17, wherein said read High Speed Radio Network Temporary identity is the first High Speed Radio Network Temporary identity.

19. The method according to claim 17, wherein if the logical channel information indicates a logical channel providing data intended for a specific mobile terminal, further comprising the steps of investigating if said data was intended for said mobile terminal and discarding said data without processing in case it was not.

20. The method according to claim 16, wherein the first group comprises channels that send data intended for a specific mobile terminal and said read High Speed Radio Network Temporary identity is a further High Speed Radio Network Temporary identity associated with a second group of logical downlink channels that provide data for a group of terminals.

21. The method according to claim 15, further comprising the step of retaining a High Speed Radio Network Temporary identity that was mapped to data of a logical channel for said mobile terminal when being in an active communication state and using it for receiving dedicated control and data, when being in a non-active communication state.

22. The method according to claim 21, wherein the active communication state is the CELL_DCH state.

23. The method according to claim 21, wherein the non-active communication state is a state in the group of CELL FACH state, CELL_PCH state and URA_PCH state.

24. The method according to claim 15, further comprising the step of receiving a paging indicator before receiving a High Speed Radio Network Temporary identity that is associated with a logical downlink paging or dedicated user channel.

25. Mobile terminal for provision in a wireless wide area system supporting High Speed Packet Access, comprising;
  processing circuitry configured to read from a Broadcast Control Channel necessary information to receive logical downlink channels via a high speed downlink shared channel, said necessary information including a High Speed Radio Network Temporary identity allocated to at least one logical downlink channel, where there exists at least a first High Speed Radio Network Temporary identity allocated to a first group of said logical downlink channels and addressing a group of mobile terminals;
  the processing circuitry further configured to listen to a high speed shared control channel for said High Speed Radio Network Temporary identity;
  in case of detecting said identity,
  the processing circuitry further configured to follow a scheduling command for said High Speed Radio Network Temporary identity,
  the processing circuitry further configured to receive data on the high-speed downlink shared channel,
  the processing circuitry further configured to process said data.

* * * * *

UNITED STATES PATENT AND TRADEMARK OFFICE
CERTIFICATE OF CORRECTION

| | | |
|---|---|---|
| PATENT NO. | : 8,755,337 B2 | Page 1 of 1 |
| APPLICATION NO. | : 12/441251 | |
| DATED | : June 17, 2014 | |
| INVENTOR(S) | : Beming et al. | |

It is certified that error appears in the above-identified patent and that said Letters Patent is hereby corrected as shown below:

On the title page, item 57, under "ABSTRACT", in Column 2, Lines 1-2, delete "downlink intended" and insert -- downlink channel intended --, therefor.

In the claims

In Column 15, Lines 2-3, in Claim 23, delete "CELL FACH" and insert -- CELL_FACH --, therefor.

In Column 15, Line 9, in Claim 25, delete "Mobile" and insert -- A mobile --, therefor.

In Column 15, Line 10, in Claim 25, delete "comprising;" and insert -- comprising: --, therefor.

Signed and Sealed this
Twenty-sixth Day of April, 2016

Michelle K. Lee
*Director of the United States Patent and Trademark Office*